US012284735B2

(12) United States Patent
Liang

(10) Patent No.: US 12,284,735 B2
(45) Date of Patent: Apr. 22, 2025

(54) LIGHT EMITTING SEMICONDUCTOR INTEGRATED CIRCUIT

(71) Applicant: Nanning City Hong Cai Illuminations Technology Company Limited, Nanning (CN)

(72) Inventor: Faquan Liang, Nanning (CN)

(73) Assignee: Nanning City Hong Cai Illuminations Technology Company Limited, Nanning (CN)

( * ) Notice: Subject to any disclaimer, the term of this patent is extended or adjusted under 35 U.S.C. 154(b) by 204 days.

(21) Appl. No.: 18/068,451

(22) Filed: Dec. 19, 2022

(65) Prior Publication Data

US 2024/0179815 A1 May 30, 2024

(30) Foreign Application Priority Data

Nov. 24, 2022 (CN) ......................... 202211481524.8

(51) Int. Cl.

*H05B 45/345* (2020.01)
*F21S 4/10* (2016.01)
*F21Y 115/10* (2016.01)

(52) U.S. Cl.

CPC .............. *H05B 45/345* (2020.01); *F21S 4/10* (2016.01); *F21Y 2115/10* (2016.08)

(58) Field of Classification Search

CPC ....... H05B 45/345; F21S 4/10; F21Y 2115/10
USPC .......................................................... 315/291
See application file for complete search history.

(56) References Cited

U.S. PATENT DOCUMENTS

| | | | | |
|---|---|---|---|---|
| 7,508,141 | B2 * | 3/2009 | Wong | H05B 47/155 315/185 S |
| 8,575,857 | B2 * | 11/2013 | Sako | H05B 45/375 315/307 |
| 8,581,512 | B2 * | 11/2013 | Hamamoto | H05B 45/14 315/307 |
| 9,485,820 | B2 * | 11/2016 | Ido | H05B 45/375 |
| 9,655,187 | B2 * | 5/2017 | Kim | H05B 45/395 |
| 11,412,589 | B2 * | 8/2022 | Cao | H05B 45/392 |
| 11,415,275 | B1 * | 8/2022 | Shan | F21S 4/10 |
| 2010/0219768 | A1 * | 9/2010 | Takaki | H05B 45/60 315/291 |
| 2010/0225235 | A1 * | 9/2010 | Nagase | H05B 45/385 315/130 |
| 2011/0121740 | A1 * | 5/2011 | Shih | H05B 45/46 315/307 |
| 2011/0260648 | A1 * | 10/2011 | Hamamoto | H05B 45/40 315/294 |
| 2012/0187863 | A1 * | 7/2012 | Nonaka | H05B 45/3725 315/291 |

(Continued)

*Primary Examiner* — Ryan Jager
(74) *Attorney, Agent, or Firm* — Westbridge IP LLC

(57) ABSTRACT

Disclosed are a light emitting semiconductor integrated circuit including a light emitting semiconductor lamp body and a high voltage constant current driver chip. The lamp body has a plurality of non-flashing LED lamps and/or flashing LED lamps connected in series. An input voltage of the high voltage constant current driver chip has a preset input voltage range, a first reverse breakdown voltage of the high voltage constant current driver chip has a preset breakdown voltage range, a first output current of the high voltage constant current driver chip has a preset output current range, and a first threshold voltage of the high voltage constant current driver chip has a preset threshold voltage range.

9 Claims, 2 Drawing Sheets

(56) References Cited

U.S. PATENT DOCUMENTS

| | | | | |
|---|---|---|---|---|
| 2014/0009074 | A1* | 1/2014 | Chen | F21S 4/15<br>315/185 R |
| 2015/0257217 | A1* | 9/2015 | Ido | H05B 45/375<br>315/246 |
| 2016/0227617 | A1* | 8/2016 | Kim | H05B 45/395 |
| 2020/0075808 | A1* | 3/2020 | Chong | H05B 45/40 |
| 2020/0100348 | A1* | 3/2020 | Xiong | H05B 47/185 |
| 2023/0108925 | A1* | 4/2023 | Van Den Biggelaar | G01J 1/44<br>315/151 |
| 2023/0380027 | A1* | 11/2023 | Zhang | H05B 45/10 |
| 2024/0179815 | A1* | 5/2024 | Liang | H05B 45/345 |

* cited by examiner

LIGHT EMITTING SEMICONDUCTOR INTEGRATED CIRCUIT

CROSS-REFERENCE TO RELATED APPLICATIONS

The present application claims priority to Chinese Patent Application No. 202211481524.8, filed on Nov. 24, 2022, all contents of which are incorporated herein in its entirety by reference.

TECHNICAL FIELD

The present application relates to light-emitting diode (LED) technologies, and more particularly, to a light emitting semiconductor integrated circuit.

BACKGROUND

At present, light emitting diodes can be roughly divided into two types: the normal type (non-flashing LED lamps) and the flashing type (flashing LED lamps). The difference between the two types of light emitting diodes lies in that, after a forward voltage is applied to the diode, the non-flashing LED lamp can be kept on, and the flashing LED lamp can flash in the preset mode (such as the single flashing mode, the double flashing mode, and the multi-color fast/slow flashing mode) under the control of a built-in control chip. Therefore, if a lamp string contains flashing LED lamps, the lamp string may be more decoratively beautiful.

The flashing LED lamp string can be obtained by improving the non-flashing LED lamp string. There are two conventional methods: firstly, directly replacing a single or several non-flashing LED lamps in the non-flashing LED light string with flashing LED lamps (hereinafter referred to as flashing lamps), as shown in FIG. 1, wherein L5 is a flashing lamp and the other lamps are non-flashing LED lamps; secondly, connecting a capacitor in parallel with the flashing lamp and packaging the flashing lamp and the capacitor, and then replacing the non-flashing LED light with the packaged flashing lamp, as shown in FIG. 2, wherein L5 is the packaged flashing lamp, and the rest are non-flashing LED lamps. However, the current flashing LED lamp string has the following disadvantages.

Firstly, it can be seen from FIG. 1 and FIG. 2 that, when the flashing LED lamp string obtained by the above two methods is connected to an alternating current (AC) power supply, a current limiting element is required. The current limiting element can be a resistance, a resistance-capacitance step-down element, or a constant current driver. Furthermore, since the LED lamp needs a direct current (DC) power supply, an extra rectifier circuit and components are required when the flashing LED lamp string is connected to the AC power, which not only increases the cost of the lamp string, but also affects the appearance of the lamp string.

Secondly, because the control chip of the flashing lamp is reverse-conductive (impedance is small), a certain number of non-flashing LED lamps must be required in a flashing LED lamp string to increase a reverse blocking voltage of the string, which limits the number of flashing lamps in the lamp string, thus, it is impossible that all the lamps in the lamp string are flashing lamps. At present, the common practice in the market is that the ratio of the number of flashing lamps to the number of non-flashing LED lamps in a lamp string is 1:4 or 1:5. This fixed configuration greatly affects the flexibility of the design of the lamp string.

As mentioned above, in the conventional LED lamp sting, the number of the flashing lamps cannot be arbitrarily changed and the flexibility of the design of the flashing LED lamp string is poor.

SUMMARY

Therefore, the present disclosure provides a light emitting semiconductor integrated circuit, aiming to solve the problem that the number of the flashing lamps in the flashing LED lamp string cannot be arbitrarily changed and the flexibility of the design of the flashing LED lamp string is poor.

A light emitting semiconductor integrated circuit, including:

- a light emitting semiconductor lamp body having a plurality of non-flashing LED lamps and/or flashing LED lamps connected in series;
- a high voltage constant current driver chip configured to connect to an external AC power supply and to convert the external AC power supply into a DC constant current source to supply the light emitting semiconductor lamp body;
- an input voltage of the high voltage constant current driver chip has a preset input voltage range, a first reverse breakdown voltage of the high voltage constant current driver chip has a preset breakdown voltage range, a first output current of the high voltage constant current driver chip has a preset output current range, and a first threshold voltage of the high voltage constant current driver chip has a preset threshold voltage range.

In an embodiment, the preset breakdown voltage range is greater than or equal to 60V.

In an embodiment, the preset input voltage range is AC100~240V.

In an embodiment, the preset output current range is 1~150 mA.

In an embodiment, the preset threshold voltage range is 0.3~80V.

In an embodiment, the high voltage constant current driver chip is connected in series with the light emitting semiconductor lamp body.

In an embodiment, the high voltage constant current driver chip is packaged in any LED lamp in the light emitting semiconductor lamp body.

In an embodiment, when the light emitting semiconductor lamp body includes a flashing LED lamp, a control chip of the flashing LED lamp is also connected with a diode; an anode of the diode is connected with an input end of the control chip of the flashing LED lamp, a cathode of the diode is connected with an output end of the control chip of the flashing LED lamp, and a second reverse breakdown voltage of the diode is preset.

In an embodiment, the control chip of the flashing LED lamp is connected with a capacitor having a capacitance, and the control chip of the flashing LED lamp has a second threshold voltage; a second output current, a sleeping time, and a duty ratio; the capacitance, the second threshold voltage, the second output current, the sleeping time, and the duty ratio are preset.

In an embodiment, the second reverse breakdown voltage is preset to be greater than 100V, the capacitance is preset to be greater than 30 pF, the second threshold voltage is preset to be less than 2.5V, the second output current is preset to be less than 20 mA, the sleeping time is preset to be greater than 3 ms, and the duty ratio is preset to be greater than 50%.

In an embodiment, a ratio of a number of the non-flashing LED lamps to a number of the flashing LED lamps in the light emitting semiconductor lamp body is 4:1.

In the present disclosure, the light emitting semiconductor integrated circuit includes the high voltage constant current driver chip. The high voltage constant current driver chip can convert the external AC power supply into a DC constant current source to supply the light emitting semiconductor lamp body. On the basis that the first reverse breakdown voltage of the high voltage constant current driver chip is high enough, there is no need to consider the problem of reverse blocking in the light emitting semiconductor integrated circuit. The number of flashing LED lamps in the light emitting semiconductor lamp body can be set arbitrarily even that all the lamps in the lamp body are all flashing lamps. Thus, the number of flashing lamps in the lamp body can be arbitrarily matched, so that the structure of the lamp body is flexible and changeable to have high practicability.

In addition, the high voltage constant current driver chip is used to convert the external AC power supply into a DC constant current source to supply the light emitting semiconductor lamp body, which can not only meet the demand for a DC power supply from the LED lamp without adding additional rectifier circuits and peripheral circuits, but also reduce the manufacturing cost and make the product more beautiful in appearance. Furthermore, when the external input voltage changes, the current supplied to the light emitting semiconductor lamp body remains unchanged, ensuring that the brightness of the lamp body can remain uniform.

BRIEF DESCRIPTION OF THE DRAWINGS

To describe the technical solutions in the embodiments of the present application more clearly, the following briefly introduces the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DETAILED DESCRIPTION OF THE EMBODIMENTS

Figure 1:
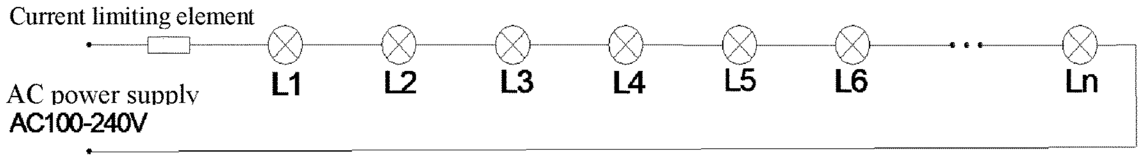
FIG. 1 (Prior Art)
FIG. 1 is a schematic view of a first type of flashing LED lamp string in the prior art.
Figure 2:
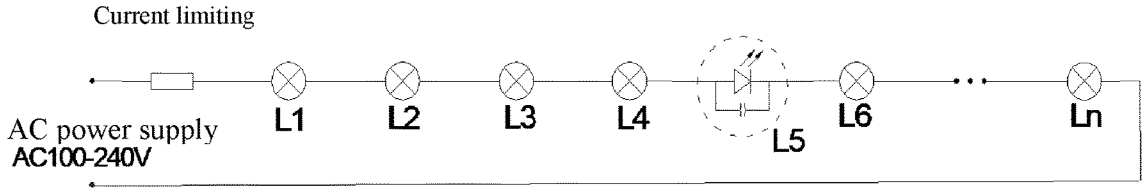
FIG. 2 (Prior Art)
FIG. 2 is a schematic view of a second type of flashing LED lamp string in the prior art.

To make a person skilled in the art better understand the technical solutions in the present application, the following clearly and completely describes the technical solutions in the embodiments of the present application with reference to the accompanying drawings in the embodiments of the present application.

It will be understood that the embodiments set forth below represent the necessary information to enable those skilled in the art to practice the application and illustrate the best mode of practicing the application. Upon reading the following description in light of the accompanying drawings, those skilled in the art will understand the concepts of the application and will recognize applications of these concepts not particularly addressed herein. It should be understood that these concepts and applications fall within the scope of the disclosure and the accompanying claims.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present application.

It will be understood that when an element or layer is referred to as being "connected to" or "coupled to" another element or layer, it can be directly connected or coupled to the other element or layer or intervening elements or layers may be present. In contrast, when an element is referred to as being "directly connected to", or "directly coupled to" another element or layer, there are no intervening elements or layers present.

It will be understood that terms such as "upper", "above", "beneath", "below", "under", "lower", "left", "right", "front", "rear", "bottom", "middle", "top" and the like referred to herein which indicate directional relationship or positional relationship are directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

These terms are used only to distinguish one element from another. For example, the first element may be referred to as an "upper" element, and similarly, the second element may be referred to as an "upper" element according to the relative orientation of these elements, without departing from the scope of the present disclosure.

It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following description, specific details are set forth in order to provide a thorough understanding of the present application. It will be apparent, however, to one skilled in the art that the application can be practiced without regard to these specific details. In other instances, well known concepts have not been described in detail in order to avoid obscuring the present application.

Figure 3:
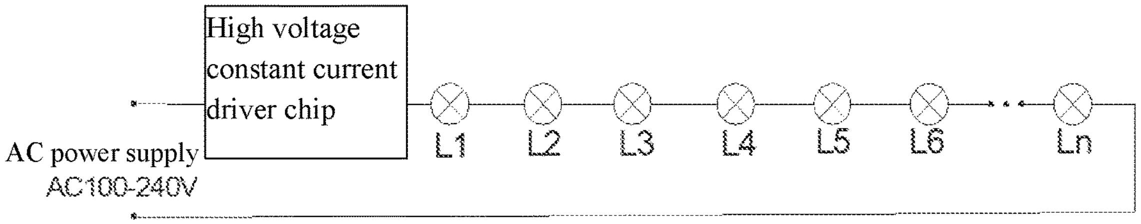
FIG. 3 is a schematic diagram of a light emitting semiconductor integrated circuit in accordance with a first embodiment of the present disclosure.

The present disclosure provides a light emitting semiconductor integrated circuit, as shown in FIG. 3, the light emitting semiconductor integrated circuit includes a light emitting semiconductor lamp body (hereinafter as "lamp body") and a high voltage constant current driver chip, and the high voltage constant current driver chip is connected in series with the lamp body.

The lamp body includes a plurality of flashing LED lamps connected in series (i.e., L1, L2 . . . and Ln in FIG. 3 are flashing LED lamps. The high voltage constant current driver chip is configured to connect to an external AC power supply and convert the external AC power supply into a DC constant current source to supply the lamp body.

An input voltage of the high voltage constant current driver chip has a preset input voltage range, a first reverse breakdown voltage of the high voltage constant current driver chip has a preset breakdown voltage range, a first output current of the high voltage constant current driver chip has a preset output current range, and a first threshold voltage of the high voltage constant current driver chip has a preset threshold voltage range.

In this embodiment, the preset input voltage range is AC100~240V, the preset breakdown voltage range is greater than or equal to 60V, the preset output current range is 1~150 mA, and the preset threshold voltage range is 0.3~80V.

In other embodiments, the preset input voltage range, the breakdown voltage range, the preset output current range, and the preset threshold voltage range can be set according to actual situations. For example, the preset input voltage range can also be AC90-250V, AC105-228V, AC95-252V or AC100-250V. The preset breakdown voltage range can also be ≥50V, ≥100V, ≥150V or ≥200V, etc. The preset output current range can also be 1~160 mA, 5~155 mA or 10~170 mA, and the preset threshold voltage range can also be 0.2~80V, 0.2~100V or 0.1~50V.

In other embodiments, the lamp body can also include a plurality of non-flashing LED lamps connected in series as L1, L2 . . . and Ln shown in FIG. 3. In some embodiments, the lamp body can also include a plurality of non-flashing LED lamps and a plurality of flashing LED lamps; at this time, some of the lamps L1, L2, . . . Ln in FIG. 3 are non-flashing LED lamps, and the other lamps are flashing LED lamps. The number of the flashing LED lamps can be set without limitation.

In other embodiments, the high voltage constant current driver chip can also be packaged in any LED lamp in the lamp body.

The working principle of the light emitting semiconductor integrated circuit in this embodiment is: the high voltage constant current driver chip can convert the external AC power supply into a DC constant current source to supply the lamp body. On the basis that the first reverse breakdown voltage of the high voltage constant current driver chip is high enough, there is no need to consider the problem of reverse blocking in the light emitting semiconductor integrated circuit. The number of flashing LED lamps in the lamp body can be set arbitrarily even that all the lamps in the lamp body are all flashing lamps. Thus, the number of flashing lamps in the lamp body can be arbitrarily matched, so that the structure of the lamp body is flexible and changeable to have high practicability. In addition, the high voltage constant current driver chip is used to convert the external AC power supply into a DC constant current source to supply the lamp body, which can not only meet the demand for a DC power supply from the LED lamp without adding additional rectifier circuits and peripheral circuits, but also reduce the manufacturing cost and make the product more beautiful in appearance. Furthermore, when the external input voltage changes, the current supplied to the lamp body remains unchanged, ensuring that the brightness of the lamp body can remain uniform.

Figure 4:
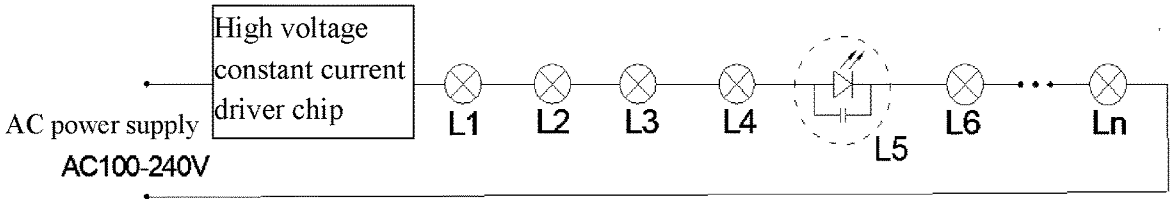
FIG. 4 is a schematic diagram of a light emitting semiconductor integrated circuit in accordance with a second embodiment of the present disclosure.

As shown in FIG. 4, the present disclosure provides a light emitting semiconductor integrated circuit in accordance with a second embodiment. The light emitting semiconductor integrated circuit includes a light emitting semiconductor lamp body (hereinafter as "lamp body") and a high voltage constant current driver chip connected to the lamp body in series. The high voltage constant current driver chip is configured to connect to an external AC power supply and convert the external AC power supply into a DC constant current source to supply the lamp body. An input voltage of the high voltage constant current driver chip ranges from AC100 to 240V, a first reverse breakdown voltage of the high voltage constant current driver chip is greater than or equal to 60V, a first output current of the high voltage constant current driver chip ranges from 1 to 150 mA, and a first threshold voltage of the high voltage constant current driver chip ranges from 0.3 to 80V.

The lamp body in this embodiment includes a plurality of non-flashing LED lamps and a number of flashing LED lamps connected in series, wherein a ratio of a number of non-flashing LED lamps to a number of flashing LED lamps is 4:1. For example, as shown in FIGS. 4, L1, L2, L3, and L4 are non-flashing LED lamps and L5 is a flashing LED lamp. In other embodiments, the ratio of the number of non-flashing LED lamps to the number of flashing LED lamps can also be adjusted according to actual needs, such as 5:1; or, the number of flashing LED lamps in the lamp body can be adjusted directly according to actual needs, without maintaining a fixed ratio.

In this embodiment, a capacitor is connected in parallel with the flashing LED lamp, as shown in FIG. 4, a capacitor is connected in parallel with the flashing lamp L5, which can allow the flashing LED lamp to work more stably. A capacitance of the capacitor connected in parallel with the flashing lamp can be preset to be greater than 30 pF. In other embodiments, the capacitance can also be adjusted according to actual needs. For example, the capacitance can also be preset to be greater than 25 pF or 40 pF. In the situations where the working environment of the lamp body is relatively stable, the capacitor connected in parallel with the flashing LED lamp can be omitted.

The lamp body and the high voltage constant current driver chip of other embodiments are as what's shown in the first embodiment, which is not repeated here.

Figure 5:
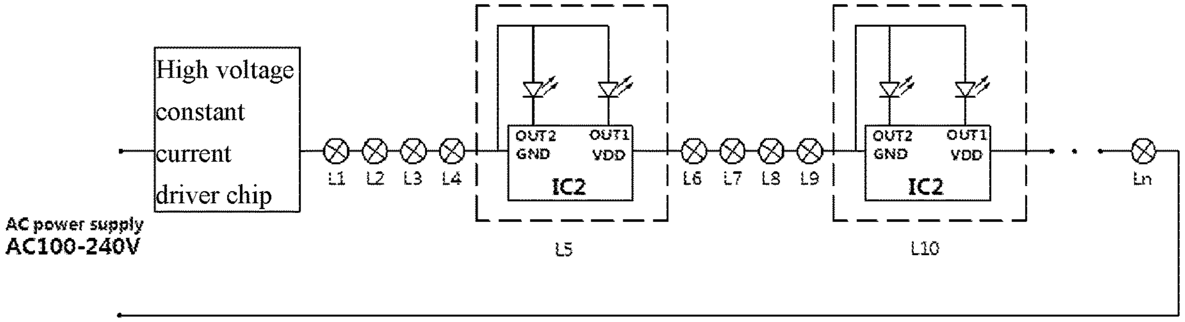
FIG. 5 is a schematic diagram of a light emitting semiconductor integrated circuit in accordance with a third embodiment of the present disclosure.

As shown in FIG. 5, the present disclosure further provides a light emitting semiconductor integrated circuit in accordance with a third embodiment. The light emitting semiconductor integrated circuit includes a light emitting semiconductor lamp body (hereinafter as "lamp body") and a high voltage constant current driver chip connected to the lamp body in series. The high voltage constant current driver chip is configured to connect to an external AC power supply and convert the external AC power supply into a DC constant current source to supply the lamp body. An input voltage of the high voltage constant current driver chip ranges from AC100 to 240V, a first reverse breakdown voltage of the high voltage constant current driver chip is greater than or equal to 60V, a first output current of the high voltage constant current driver chip ranges from 1 to 150 mA, and a first threshold voltage of the high voltage constant current driver chip ranges from 0.3 to 80V.

In this embodiment, a control chip of a flashing LED lamp is also connected with a diode. An anode of the diode is connected with an input end of the control chip of the flashing LED lamp, and a cathode of the diode is connected with an output end of the control chip of the flashing LED lamp. A second reverse breakdown voltage of the diode is preset to be greater than than 100V. Through the configuration, the second reverse breakdown voltage of the diode is high enough that the structure of the lamp body can be designed without considering the reverse blocking of the diode. Thus, the number of flashing LED lamps in the lamp body can be set arbitrarily even that all the lamps in the lamp body are all flashing LED lamps, and the ratio of a number of non-flashing LED lamps to a number of flashing LED lamps in the lamp body as shown in FIG. 5 is not limited to 4:1.

In other embodiments, the second reverse breakdown voltage can also be adjusted according to actual situations, for example, the second reverse breakdown voltage can be preset to be greater than 120V or 160V or 200V.

A second threshold voltage, a second output current, a sleeping time, a duty ratio of the control chip of the flashing LED lamp can be preset.

In this embodiment, the second threshold voltage can be preset to be less than 2.5V, the second output current can be preset to be less than 20 mA, the sleeping time can be preset to be greater than 3 ms, and the duty ratio can be preset to be greater than 50%.

In other embodiments, the second threshold voltage, the second output current, the sleeping time, the duty ratio can be adjusted according to actual needs. For example, the second threshold voltage can be less than 2.3V or less than 3V. The second output current value can also be less than 18 mA or less than 25 mA. The sleeping time can also be greater than 2 ms or 4 ms. The duty ratio can also be greater than 45% or 55%.

The lamp body and the high voltage constant current driver chip of other embodiments are as what's shown in the first embodiment, which is not repeated here.

The working principle of the light emitting semiconductor integrated circuit is as follows: the high voltage constant current driver chip is configured to convert the external AC power supply into a DC constant current source to supply the lamp body. On one hand, this configuration can meet the demand for the DC power supply from the LED lamp without adding rectifier circuits and peripheral circuits, which reduces the manufacturing cost and allows the product appearance to be more beautiful. On the other hand, when the external input voltage changes, the current supplied to the lamp body remains unchanged so that the brightness of the lamp body can remain uniform. In addition, the first reverse breakdown voltage of the high voltage constant current driver chip is high enough, and the second reverse breakdown voltage of the diode connected to the control chip of the flashing LED lamp is also high enough. Therefore, there is no need to consider the reverse blocking problem when designing the structure of the lamp body. The number of flashing LED lamps in the lamp body can be set arbitrarily even that all the lamps in the lamp body are all flashing LED lamps.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

What is claimed is:

1. A light emitting semiconductor integrated circuit, comprising:

a light emitting semiconductor lamp body having a plurality of non-flashing light-emitting diode (LED) lamps and/or flashing LED lamps connected in series; and a high voltage constant current driver chip configured to connect to an external alternating current (AC) power supply and to convert the external AC power supply into a direct current (DC) constant current source to supply the light emitting semiconductor lamp body, wherein an input voltage of the high voltage constant current driver chip has a preset input voltage range, a first output current of the high voltage constant current driver chip has a preset output current range, and a first threshold voltage of the high voltage constant current driver chip has a preset threshold voltage range;

the high voltage constant current driver chip is connected in series with the light emitting semiconductor lamp body; and when the light emitting semiconductor lamp body comprises a flashing LED lamp, a control chip of the flashing LED lamp is also connected with a diode; an anode of the diode is connected with an input end of the control chip of the flashing LED lamp, a cathode of the diode is connected with an output end of the control chip of the flashing LED lamp.

2. The light emitting semiconductor integrated circuit of claim 1, wherein the preset input voltage range is AC100~240V.

3. The light emitting semiconductor integrated circuit of claim 2, wherein the preset output current range is 1~150 mA.

4. The light emitting semiconductor integrated circuit of claim 3, wherein the preset threshold voltage range is 0.3~80V.

5. The light emitting semiconductor integrated circuit of claim 2, wherein the high voltage constant current driver chip is packaged in any LED lamp in the light emitting semiconductor lamp body.

6. The light emitting semiconductor integrated circuit of claim 1, wherein the high voltage constant current driver chip is packaged in any LED lamp in the light emitting semiconductor lamp body.

7. The light emitting semiconductor integrated circuit of claim 1, wherein the control chip of the flashing LED lamp is connected with a capacitor having a capacitance, and the control chip of the flashing LED lamp has a second threshold voltage; a second output current, a sleeping time, and a duty ratio; the capacitance, the second threshold voltage, the second output current, the sleeping time, and the duty ratio are preset.

8. The light emitting semiconductor integrated circuit of claim 7, wherein the capacitance is preset to be greater than 30 pF, the second threshold voltage is preset to be less than 2.5V, the second output current is preset to be less than 20 mA, the sleeping time is preset to be greater than 3 ms, and the duty ratio is preset to be greater than 50%.

9. The light emitting semiconductor integrated circuit of claim 1, wherein a ratio of a number of the non-flashing LED lamps to a number of the flashing LED lamps in the light emitting semiconductor lamp body is 4:1.

* * * * *